United States Patent [19]

Oshima et al.

[11] Patent Number: 4,810,458

[45] Date of Patent: Mar. 7, 1989

[54] PROCESS FOR EXTRUSION-MOLDING CERAMIC BODIES

[75] Inventors: Shinji Oshima, Ama; Hiromi Shimada, Nagoya, both of Japan

[73] Assignee: NGK Insulators, Ltd., Nagoya, Japan

[21] Appl. No.: 101,493

[22] Filed: Sep. 28, 1987

[30] Foreign Application Priority Data

Oct. 18, 1986 [JP] Japan ............................... 61-248148

[51] Int. Cl.[4] ............................................ B29C 47/88

[52] U.S. Cl. .................................... 264/555; 264/557; 264/563; 264/177.11; 264/211.11; 264/234; 264/345; 425/72.1; 425/94

[58] Field of Search ...................... 264/211.11, 211.12, 264/177.11, 177.12, 555, 557, 563, 176.1, 169, 148, 150, 570, 234, 345; 425/72.1, 377, 387.1, 94, 104

[56] References Cited

U.S. PATENT DOCUMENTS

| | | | |
|---|---|---|---|
| 2,032,624 | 3/1936 | Lyons | 264/169 |
| 2,952,877 | 9/1960 | Park, Jr. | 264/63 |
| 3,212,154 | 10/1965 | Crumpler | 425/380 |
| 4,159,295 | 6/1979 | Mazzuchelli et al. | 264/63 |
| 4,171,337 | 10/1979 | Rosen et al. | 264/211.11 |
| 4,496,501 | 1/1985 | Linke et al. | 425/72.1 |

FOREIGN PATENT DOCUMENTS

| | | | |
|---|---|---|---|
| 60-138710 | 9/1985 | Japan . | |
| 60-203405 | 10/1985 | Japan . | |
| 61-86470 | 5/1986 | Japan . | |
| 61-108506 | 5/1986 | Japan . | |
| 61-182921 | 8/1986 | Japan | 264/555 |

*Primary Examiner*—Jeffery Thurlow
*Attorney, Agent, or Firm*—Parkhurst, Oliff & Berridge

[57] ABSTRACT

A ceramic body is continuously extruded through a die of an extruder and held on a porous support at a slightly floating state by air pressure jetted from pores of the support.

5 Claims, 1 Drawing Sheet

PROCESS FOR EXTRUSION-MOLDING CERAMIC BODIES

BACKGROUND OF THE INVENTION

1. Field of the Invention

This invention relates to a process for extrusion-molding a ceramic body such as thin and elongated ceramic tube, ceramic rod or the like.

2. Related Art Statement

As the process for extrusion-molding a ceramic tube, ceramic rod or the like, there are known an upward extrusion process, a downward extrusion process, an oblique extrusion process and the like. In these processes, however, the ceramic body extruded through a die of an extruder is apt to be deformed by its own weight and it is difficult to shape a thin and elongated ceramic body. Furthermore, there is known a horizontal extrusion process wherein a ceramic body is extruded in a horizontal direction and then held by a support coated with a lubricating oil. In this process, however, the ceramic body is apt to be deformed by frictional resistance between the ceramic body and the support and it is difficult to obtain a ceramic molded body having a high dimensional accuracy. Also, there is a process wherein a ceramic body extruded in a horizontal direction is supported by a self-running conveyor synchronized with the extrusion velocity. In this case, however, it is difficult to completely match the extrusion velocity with the running velocity of the conveyor and deformation of the ceramic body can not completely be prevented.

SUMMARY OF THE INVENTION

It is an object of the invention to solve the aforementioned drawbacks of the conventional techniques and provide a process for extrusion-molding ceramic bodies which can shape a tubular or rod-like ceramic body at a state extruded through a die of an extruder without deformation.

According to the invention, there is the provision of a process for extrusion-molding a ceramic body, which comprises continuously extruding a ceramic body through a die of an extruder and holding it on a porous support provided with a recess portion having a shape corresponding to a sectional shape of the ceramic body, at a slightly floating state by an air pressure which is jetted from pores of the support.

DESCRIPTION OF THE PREFERRED EMBODIMENT

Figure 1:
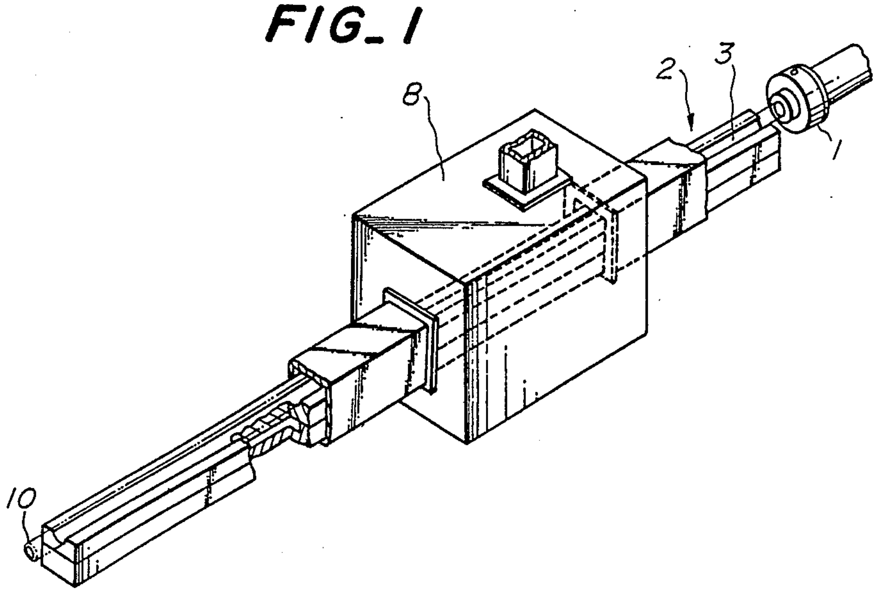
FIG. 1 is a partially cutaway perspective view of an extrusion-molding apparatus used in the invention.

The invention will be described with reference to an embodiment shown in the drawings.

Figure 2:
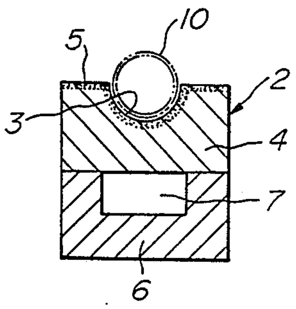
FIG. 2 is a sectional view of a support used in the apparatus of FIG. 1.

In the practice of the invention, there is used an apparatus shown in FIG. 1, wherein numeral 1 is a die of an extruder and numeral 2 is an elongated support horizontally disposed adjacent to the outlet of the die 1 and made from a porous material. As shown in FIG. 2, the support 2 has a laminate structure of an upper member 4 provided with a recess portion 3 of a shape corresponding to a sectional shape of an extrusion-molded ceramic body 10 and a lower member 6 provided with a groove serving as an air reservoir 7. The upper member 4 has a large pore size at its bottom and a small pore size at its outer surface portion 5. When compressed air of $0.1 \sim 20$ kg/cm$^2$, preferably $1 \sim 3$ kg/cm$^2$ is supplied to the air reservoir 7 inside the support 2, it passes through pores of the upper member 4 and is jetted from the outer surface portion 5 toward the recess portion 3. Moreover, the air reservoir 7 is formed in the joint part between the upper member 4 and the lower member 6 in the illustrated support 2, but the structure of the air reservoir may freely be selected if the compressed air of a given pressure can be jetted from the surface of the recess portion 3. As shown in FIG. 1, a drying chamber 8 is arranged in the course of the support 2, wherein the ceramic body 10 passing through the chamber 8 is dried by a proper heating means such as electric heat, hot air, microwave or the like.

According to the invention, the ceramic body 10 continuously and horizontally extruded through the die 1 of the extruder is supported by the porous support 2 provided with the recess portion 3 of a shape corresponding to the sectional shape of the ceramic body. In this case, since the compressed air supplied to the air reservoir inside the porous support 2 is jetted through pores toward the recess portion 3 to form an air cushioning layer on the outer surface of the recess portion 3, the ceramic body 10 is held at such a state that the ceramic body is slightly floated above the support 2 by an air pressure. As a result, the frictional resistance between the ceramic body 10 and the support 2 becomes substantially zero, so that the continuously extrusion-molded ceramic body 10 goes ahead on the support 2 without deformation, and is dried and solidified in the drying chamber.

Moreover, when a liquid lubricant is previously impregnated in the inside of the porous support 2, it is foamed out with the jetting of the compressed air, whereby the frictional resistance is further reduced to make the extrusion more smooth.

According to the invention, the frictional resistance between the ceramic body 10 and the support 2 can be made substantially zero, so that the length of the support 2 can sufficiently be lengthened and hence small-sized, thin and considerably elongated ceramic pipe can be shaped with good accuracy without deformation. Moreover, when the laminate structure provided with a surface portion of small pore size as shown in the illustrated embodiment is used as the support 2, a sufficient amount of air can uniformly be jetted, whereby the ceramic body 10 can be supported in a more balanced manner.

As mentioned above, according to the invention, tubular, rod-like ceramic bodies can continuously be extrusion-molded in accordance with the shape of the die in the extruder with a high dimensional accuracy. Particularly, the invention is suitable for the shaping of thin and elongated ceramic pipes. Therefore, the invention solves the aforementioned problems in the extrusion-molding of the ceramic bodies and largely contributes to the industrial development.

What is claimed is:

1. A process for extrusion-molding a ceramic body, comprising:

continuously extruding a ceramic body through a die of an extruder; and supporting the extruded ceramic body in a floating state on a porous support positioned horizontally proximate to said die, said porous support having a laminate structure including (a) an upper member and a lower member, said upper member including a recess portion having a shape corresponding to a sectional shape of said extruded ceramic body, (b) pores of a small pore size at an outer surface portion thereof, and (c) pores of a large pore size at an inner surface portion thereof;

wherein said extruded ceramic body is supported in said floating state by an air pressure jetted from the pores of said porous support and said extruded ceramic body is substantially free from deformation.

2. A process according to claim 1, further comprising the step of providing compressed air at 0.1–20 $kg/cm^2$ into an internal portion of said porous support.

3. A process according to claim 1, further comprising the step of impregnating said porous support with a liquid lubricant, such that said liquid lubricant is foamed out of said porous support through said pores by said air pressure.

4. A process for extrusion-molding a ceramic body, comprising:

continuously extruding a ceramic body through a die of an extruder;

supporting the extruded ceramic body in a floating state on a porous support; and drying the supported extruded ceramic body by passing said body through a heating chamber.

5. A process for extrusion-molding a ceramic body, conprising:

continuously extruding a ceramic body through a die of an extruder;

supporting the extruded ceramic body in a floating state on a porous support positioned horizontally proximate to said die, said porous support having a laminate structure including (a) an upper member and a lower member, said upper member including a recess portion having a shape corresponding to a sectional shape of said extruded ceramic body, (b) pores of a small pore size at an outer surface portion thereof, and (c) pores of a large pore size at an inner surface portion thereof, wherein said extruded ceramic body is supported in said floating state by an air pressure jetted from the pores of said porous support and said extruded ceramic body is substantially free from deformation; and drying the supported extruded ceramic body by passing said body through a heating chamber.

* * * * *